United States Patent [19]

Thür et al.

[11] Patent Number: 5,067,434

[45] Date of Patent: Nov. 26, 1991

[54] ELECTROSTATIC PAINT SPRAY GUN

[75] Inventors: Alex Thür, Hinterforst; Kurt Seitz, Widnau, both of Switzerland

[73] Assignee: Wagner International AG, Switzerland

[21] Appl. No.: 541,514

[22] Filed: Jun. 21, 1990

[30] Foreign Application Priority Data

Jun. 28, 1989 [DE] Fed. Rep. of Germany ....... 3921213

[51] Int. Cl.[5] .......................... B05B 5/00; B05B 5/02; H02M 7/10

[52] U.S. Cl. .................................... 118/629; 118/300; 239/690; 239/DIG. 14; 361/228

[58] Field of Search ................ 118/629, 300; 361/227, 361/228; 239/690, 690.1, 703, 704, 706, 707, 708, DIG. 14, 319

[56] References Cited

U.S. PATENT DOCUMENTS

| | | | |
|---|---|---|---|
| 3,599,038 | 8/1971 | Skidmore | 361/228 |
| 4,033,506 | 7/1977 | Braun | 361/228 |
| 4,196,465 | 4/1980 | Buschor | 361/228 |
| 4,287,552 | 9/1981 | Wagner et al. | 361/228 |
| 4,290,091 | 9/1981 | Malcolm | 361/228 |
| 4,323,947 | 4/1982 | Huber | 361/228 |
| 4,441,656 | 4/1984 | Huber | 239/708 |
| 4,572,437 | 2/1986 | Huber et al. | 239/703 |
| 4,651,932 | 3/1987 | Huber et al. | 239/707 |
| 4,750,676 | 6/1988 | Huber et al. | 239/707 |
| 4,752,034 | 6/1988 | Kuhn et al. | 239/690 |
| 4,775,105 | 10/1988 | Rese | 239/704 |

*Primary Examiner*—Willard Hoag

[57] ABSTRACT

An electrostatic paint spray gun having built-in high-voltage generator that is cast into insulating material is improved in that the dielectric strength is increased in the region of that face of the insulating member that is adjacent to the charging electrode. In a first solution, the high-voltage cascade is cast such into the plastic member for this purpose that its high-voltage output is situated adjacent the input transformer, whereby a small plug tube for the stranded electrode lead is additionally co-cast into the insulating member parallel to the cascade. In a second solution, an annular gap is left free between the stranded electrode lead and the insulating member, is filled with insulating oil and is sealed with a seal.

9 Claims, 4 Drawing Sheets

ELECTROSTATIC PAINT SPRAY GUN

BACKGROUND OF THE INVENTION

The invention is directed to an electrostatic paint spray gun comprising a built-in high-voltage generator that is composed of a transformer and a high-voltage cascade extending in the gun barrel, whereby a low-voltage input of the cascade is connected to the transformer output and a high-voltage output is connected to the high-voltage electrode of the gun with a stranded lead, and whereby the transformer and cascade are cast into an insulating member. Such paint spray guns have been known for a long time and are commercially available.

In these known electrostatic paint spray guns, a ring transformer is fed with the voltage coming from the mains or, respectively, from the power pack means, the high-voltage output of this ring transformer being in communication with the first stage of a high-voltage cascade, whereby that end of the cascade remote from the ring transformer forms the high-voltage output and is in communication with the high-voltage electrode of the gun via a line. The cascade is thereby generally constructed such that it comprises two columns of capacitors and a corresponding row of diodes lying respectively opposite one another. The high-voltage output of the cascade is connected to helically arranged resistors and to an insulated line, namely, to the stranded lead that leads to the high-voltage electrode, whereby that region of the stranded lead neighboring the high-voltage output is helically wound. The transformer, the high-voltage cascade, the resistors and the helically wound stranded part are cast out with a casting compound and thus embedded in an insulating member that usually has a cylindrical shape. As known, however, care must be exercised in the manufacture of the insulating member to see that the curing temperature for the casting compound does not go above 58° C. because the insulating hose of the co-cast stranded region does not withstand a higher temperature. Expressed in other terms, there is a non-compatibility between the insulating hose and the casting compound, namely, to the effect that they have different temperature shrink behavior, with the consequence that a gap is formed at least over sub-regions between the insulating hose and the cured casting compound given too high a curing temperature, this, as experience has taught, leading to breakdowns. This necessarily results in a high reject rate in the manufacture of such cascades.

SUMMARY OF THE INVENTION

It is therefore an object of the invention to improve electrostatic paint spray guns of the type described above such that the insulation reliability is considerably increased without thereby making the structure and manufacture more involved and without enlarging the structure.

This object is achieved by intentionally providing a gap between an insulating hose that surrounds the high-voltage output stranded lead and an insulating member and then filling the gap with an insulating oil and closing the gap with a sealing member.

A first embodiment of the invention is disclosed wherein the high-voltage output of the cascade faces toward the transformer and a small insulator tube is cast into the insulating member parallel to an axis of the cascade, that end of said small tube adjacent to the high-voltage output of the cascade being fashioned as a plug receptacle and being conductively connected to said high-voltage output and the other end of said small insulating tube discharging toward the outside on the insulating member, whereby the stranded electrode lead is introduced into the small tube of insulating material and has a stripped end plugged into the plug receptacle. If desired, and for greater insulation reliability, insulating oil can be filled into a gap between the insulation hose of the stranded electrode and the tube of insulating material, and the gap then sealed with an O-ring.

This solution leads to an especially high insulation reliability and, over and above this, allows the stranded electrode lead to be pluggably held in the insulator member and thus be interchangeable.

A second embodiment of the invention is disclosed wherein the low-voltage input of the high-voltage cascade faces toward the transformer and the high-voltage output is conducted out of the insulator member as said stranded electrode lead clad with an insulating hose; and in that an annular gap that discharges toward the outside from the insulator member is left free between insulating hose of the stranded electrode lead and the insulator member, said annular gap being filled with an insulating oil and being closed from the outside with an O-ring. This solution, wherein the high-voltage cascade is arranged in the usual way, is distinguished by particular simplicity and low manufacturing costs; this is particularly true when the manufacture ensues according to a method for the manufacture of an electrostatic paint spray gun according to claim 8, wherein a temperature greater than 58° is selected as a curing temperature for the insulator member and, after the curing of the insulator member, the annular gap that has arisen is derated in a vacuum chamber and insulating oil that likewise resides under a vacuum is simultaneously filled thereinto.

BRIEF DESCRIPTION OF THE DRAWINGS

Embodiments of the two embodiments of the invention are shown by way of example on the drawings.

DESCRIPTION OF THE PREFERRED EMBODIMENTS

Figure 1:
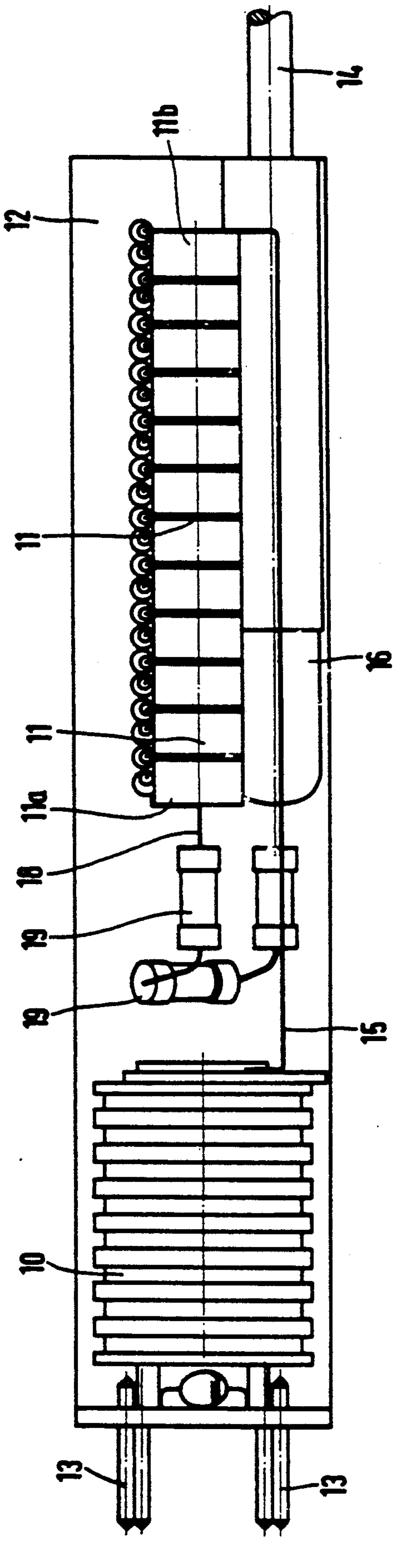
FIG. 1 is a longitudinal section through the insulator member containing the transformer and high-voltage cascade conforming to the first embodiment of the invention.
Figure 2:
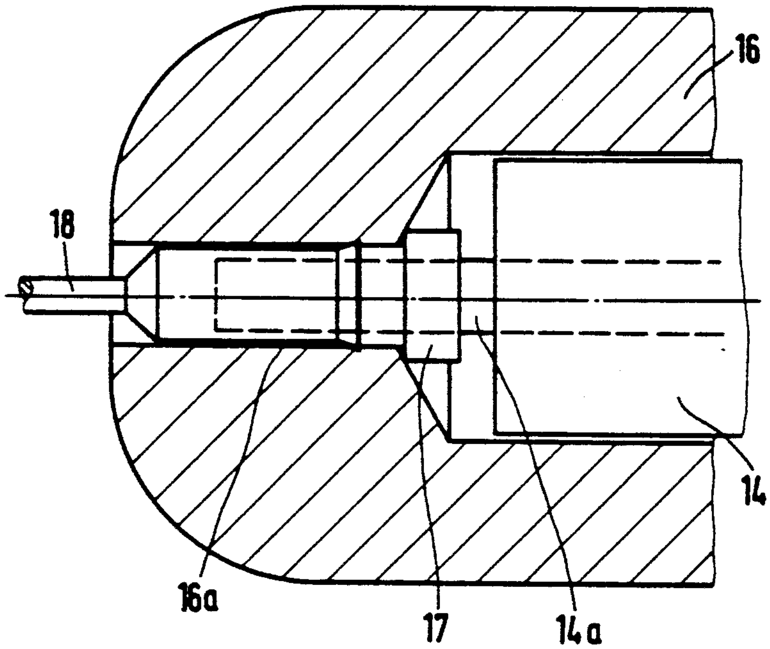
FIGS. 2 and 3 are enlarged portions (in various scales) of the small insulator tube introduced into the insulator member of FIG. 1.
Figure 3:
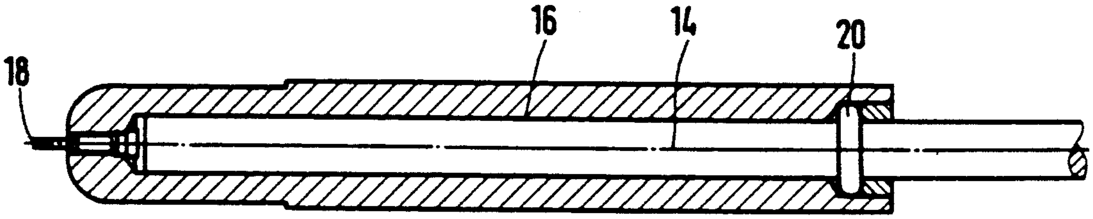

In the embodiment of FIGS. 1-3, 10 (FIG. 1) references a transformer and 11 references a high-voltage cascade, whereby these two component parts are arranged coaxially following one another and are cast into a common insulating member 12 having a cylindrical shape. This insulating member 12 is inserted in a known way into the gun barrel of the electrostatic paint spary gun (not shown). Two terminal ends 13 for the connection of the low-voltage side (primary coil) of the transformer 10 to the supply main project from the rear end face of the insulating member 12; a clad stranded lead 14 that supplies the high-voltage delivered by the output of the cascade 11 at the high-voltage side to the charging electrode (likewise not shown) of the paint spray gun projects from the front end side of the insulating member. What is then critical is that, contrary to the usual arrangement, the high voltage output 11*a* of the high-voltage cascade 11 faces toward the transformer 10 and the low-voltage input 11*b* faces away from the transformer 10. The output line 15 of the transformer 10 therefore leads to the cascade 11 along the cascade and parallel to the axis thereof and discharges into the low-voltage input 11*b* of the cascade 11 that faces away from the transformer 10. The line 15 is thereby a non-clad wire, whereby the guidance thereof in the insulating member 12 presents few problems because, of course, its voltage is still comparatively low. What is significantly more problematical, by contrast, is the guidance and design of the high-voltage output of the cascade because what is involved here is the insulation of an output voltage of the cascade 11 of, for example, 90 kV. A small tube 16 likewise composed of insulator is thereby cast into the insulating member 12, the end of this small tube 16 facing toward the transformer 10 being fashioned as a plug receptacle, i.e. a metallic plug receptacle 17 (FIG. 2) is pressed into the end bore 16*a* of the small tube 16. A line wire 18 departing from the high-voltage end 11*a* of the cascade 11 leads via known output resistors 19 to the plug receptacle 17 and is conductively connected thereto, for instance by soldering. The other end of the small tube 16 discharges at the front end face of the insulating member 12 and the stranded electrode lead 14 is introduced into the small tube proceeding from this open end, whereby the front end of the stranded conductor 14*a* is stripped and is introduced into the plug receptacle 17 under pressure, as proceeds best from FIG. 2. An O-ring 20 (FIG. 3) that is slipped on and pressed into an annular groove neighboring the discharge of the small tube serves the purpose of achieving a reliable hold of the stranded conductor 14 in the small tube 16.

The high-voltage cascade 11 can have the standard structure comprising two columns of capacitors and intervening diodes; however, it is expedient to arranged the diodes in a zig-zag arrangement at only one side of the two capacitor columns because a free space between the two capacitor columns thus arises at the side free of diodes, this free space being utilized for the attachment of the small tube 16. An extremely compact structure derives in this way, so that the diameter of the insulating member 12 need not be selected greater than in the case of standard arrangements without such a small tube 16.

Further, it should also be mentioned that the small tube 16 can be manufactured of a material that enters into an intimate bond with the casting compound of the insulating member, so that no gap between the small tube and the casting compound derives after the casting. This structure then also makes it possible to cure the casting compound at considerably higher temperatures. The stranded electrode lead is then not introduced into the small tube until after the insulating member has cured and the stripped end of the stranded electrode lead is plugged into the plug receptacle. For further improvement of the insulation, an insulating fluid can be filled into the small tube air-free and a liquid-tight and air-tight closure can be subsequently achieved with the O-ring 20.

Despite a simple manufacturing process, a high and durable insulation reliability is achieved without the risk of breakdowns in the jeopardized region of the end face of the insulating member that faces toward the electrode.

Figure 4:
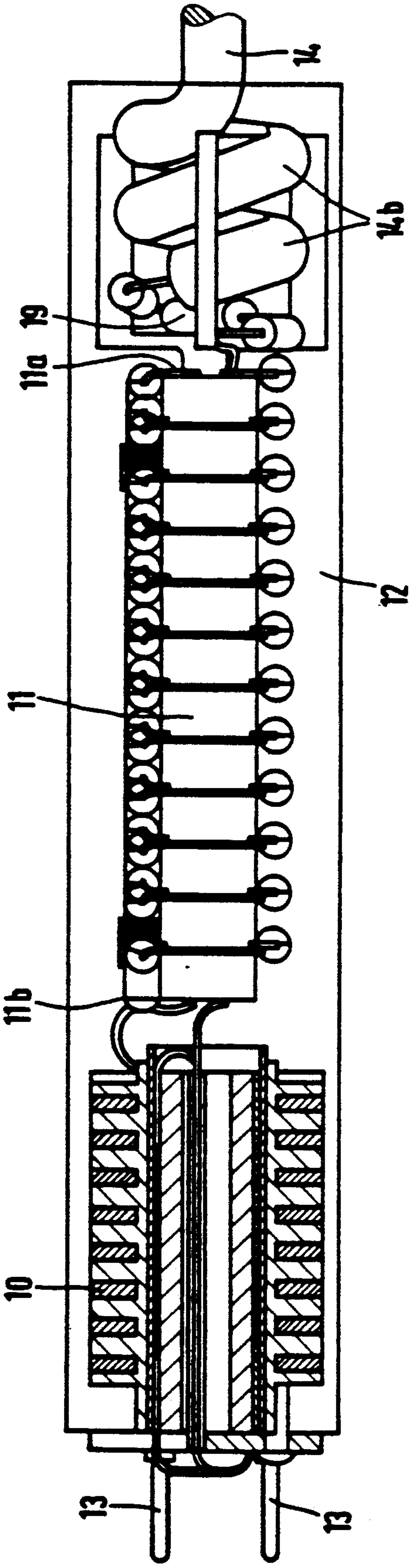
FIG. 4 is a longitudinal section through the insulator member containing the transformer and high-voltage cascade conforming to the second embodiment.
Figure 5:
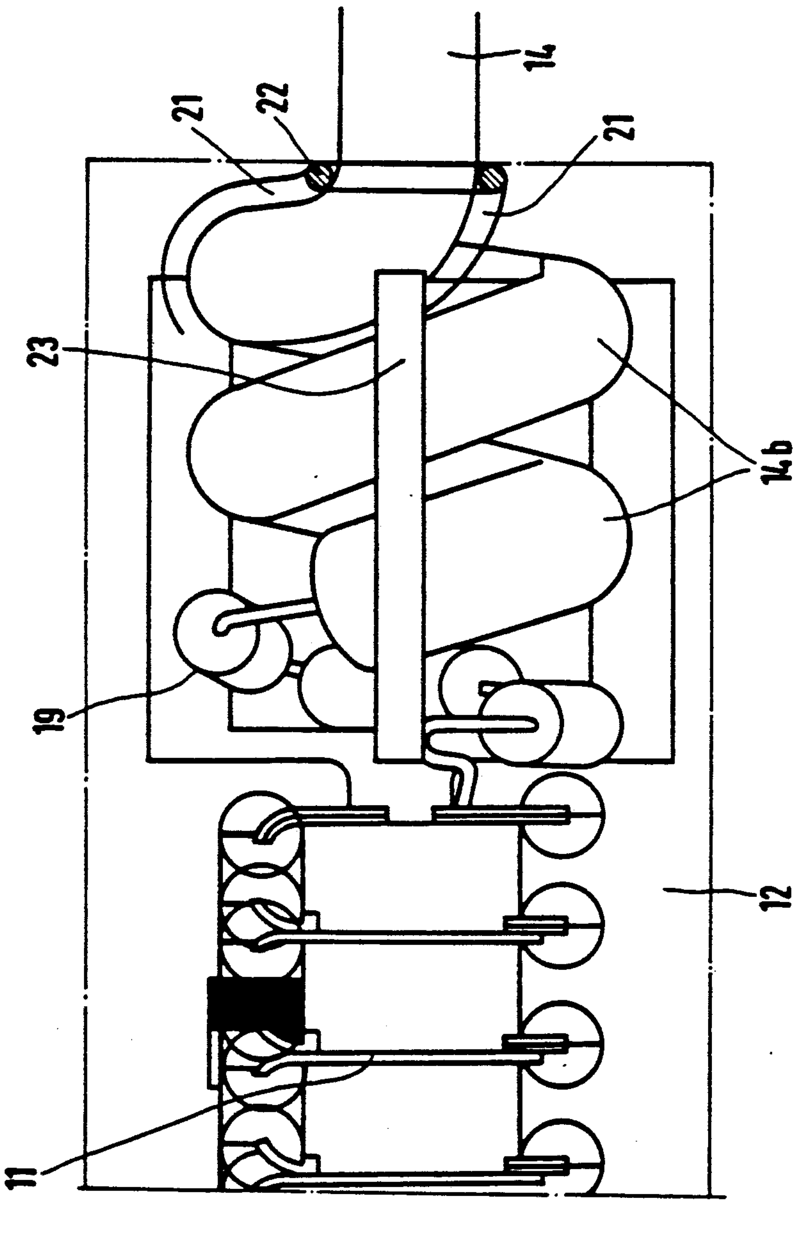
FIG. 5 is an enlarged portion of the high-voltage end of the cascade of FIG. 4.

FIGS. 4 and 5 show a second embodiment of the invention providing a second solution to the stated object. The high-voltage cascade 11 is thereby arranged in a known way relative to the transformer 10, namely, such that the low-voltage input 11*b* faces toward the transformer 10 and is directly connected to the output thereof. The high-voltage output 11*a* of the cascade 11 that is remote from the transformer is executed with helically arranged resistors 19 and is connected to the stranded electrode lead 14 that is likewise helically wound in the connecting region (enlargement of the spark gap). The transformer 10, the high-voltage cascade 11, the resistors 19 and the helically wound region 14*b* of the stranded electrode lead 14 are cast into the insulating member 12. As indicated in FIG. 5, an annular gap 21 that extends up to the connecting end of the stranded conductor 14 is kept free between the casting compound of the member 12 and the insulating hose of the stranded lead 14 (in FIG. 5, only a sub-region of the annular gap 21 is shown for the sake of simplicity). This annular gap 21 is filled with an insulating oil and has its discharge end sealed with an O-ring 22. 23 references a retaining cross of insulating material for holding the resistors and the stranded helix in a fixed position, this retaining cross being likewise cast in.

In that a gap 21 between the stranded lead 14 and casting compound is intentionally kept free and this is filled with insulating oil and seals, a good and durable insulating reliability of this region is provided. Without such inventively provided oil and seals, this region is subject to breakdown.

The preparation of the gap 21 can be carried out as follows. A standard, temperature-curing compound is employed as the casting compound and a wire clad with a standard insulating hose is employed as the stranded electrode lead. A comparatively high temperature (above 56° C.) is then selected for curing the casting compound, this resulting in the formation of the desired annular gap 21 due to the different temperature shrink behavior of curing compound and insulating hose. The gap is subsequently derated in a vacuum chamber and oil residing under a vacuum is simultaneously introduced into the arising gap, i.e. the oil is even drawn into the gap by itself under capillary action. As tests have shown, this insulating oil does not re-emerge from the gap 21 or only re-emerges therefrom after an extremely long time, so that the free gap orifice between casting compound and insulating hose can be left open. A more reliable and durable insulation, however, is achieved in that the tightly seated O-ring 22 is placed onto the stranded conductor 14 and the gap orifice is thus closed. 80° C. can be recited as a numerical example of the said, high curing temperature with reference to standard materials for the casting compound and for the insulating hose of the stranded conductor, for instance acid-anhydride cured epoxy resin, hot-curing, and polyethylene. A charge-compatible vegetable oil, for example castor oil, is utilized as insulating oil.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. An electrostatic paint spray gun comprising a built-in high-voltage generator that is composed of a transformer and a high-voltage cascade extending in the gun barrel, whereby a low-voltage input of the cascade is connected to the transformer output and a high-voltage output is connected to the high-voltage electrode of the gun with a stranded lead, and whereby transformer and cascade are cast into an insulating member, wherein the high-voltage output is conducted out of the insulating member as a stranded electrode lead clad with an insulating hose, a gap is provided between said insulating hose and said insulating member, said gap being filled with an insulating oil and being closed with a sealing member.

2. An electrostatic paint spray gun according to claim 1, wherein the high-voltage output of the cascade faces toward the transformer and a small insulator tube is cast into the insulating member parallel to an axis of the cascade, that end of said small tube adjacent to the high-voltage output of the cascade being fashioned as a plug receptacle and being conductively connected to said high-voltage output and the other end of said small insulating tube discharging toward the outside on the insulating member, whereby the stranded electrode lead is introduced into the small tube of insulating material and has a stripped end plugged into the plug receptacle, said gap being formed between said insulating tube and said insulating hose.

3. An electrostatic paint spray gun according to claim 1, wherein the low-voltage input of the high-voltage cascade faces toward the transformer and the high-voltage output is conducted out of the insulator member as said stranded electrode lead clad with an insulating hose; and wherein said gap comprises an annular gap that discharges toward the outside of the insulator member which is left free between insulating hose of the stranded electrode lead and the insulator member, said annular gap being closed from the outside with an O-ring.

4. An electrostatic paint spray gun comprising a built-in high-voltage generator that is composed of a transformer and a high-voltage cascade extending in the gun barrel, whereby a low-voltage input of the cascade is connected to the transformer output and a high-voltage output is connected to the high-voltage electrode of the gun with a stranded lead, and whereby transformer and cascade are cast into an insulating member, the high-voltage output of the cascade faces toward the transformer and a small insulator tube is cast into the insulating member parallel to an axis of the cascade, that end of said small tube adjacent to the high-voltage output of the cascade being fashioned as a plug receptacle and being conductively connected to said high-voltage output and the other end of said small insulating tube discharging toward the outside on the insulating member, whereby the stranded electrode lead is introduced into the small tube of insulating material and has a stripped end plugged into the plug receptacle.

5. An electrostatic paint spray gun according to claim 4, wherein the small insulator tube is filled with an insulating oil and is sealed with an O-ring that surrounds the stranded electrode lead.

6. An electrostatic paint spray gun according to claim 4, wherein the resistors are introduced into the high-voltage output line of the cascade.

7. An electrostatic paint spray gun according to claim 4 comprising a high-voltage cascade of two columns of capacitors and comprising diodes, characterized in that the diodes are arranged in a zig-zag arrangement at one side of the two capacitor columns; in that the small insulator tube is situated at the other side of the two capacitor columns.

8. An electrostatic paint spray gun comprising a built-in high-voltage generator that is composed of a transformer and a high-voltage cascade extending in the gun-barrel, whereby a low-voltage input of the cascade is connected to the transformer output and a high-voltage output is connected to a high-voltage electrode of the gun with a stranded lead, and whereby transformer and cascade are cast into an insulating member, the low-voltage input of the high-voltage cascade faces toward the transformer and the high-voltage output is conducted out of the insulator member as said stranded electrode lead clad with an insulating hose; and in that an annular gap that discharges toward the outside from the insulator member is left free between insulating hose of the stranded electrode lead and the insulator member, said annular gap being filled with an insulating oil and being closed from the outside with an O-ring.

9. An electrostatic paint spray gun according to claim 8, wherein the region of the stranded electrode conductor situated inside the insulator member is helically wound and is connected to the high-voltage output of the cascade via resistors.

* * * * *